May 1, 1934.　　　M. PARKER ET AL　　　1,956,587
SCISSORS
Filed March 4, 1932
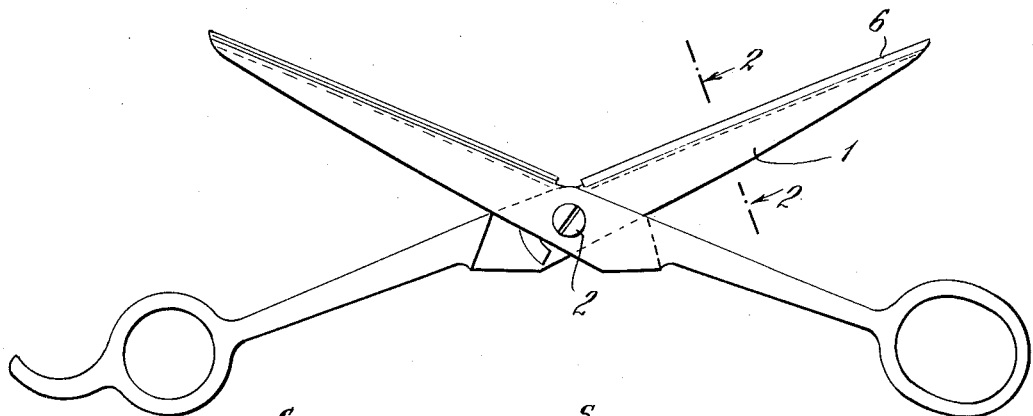
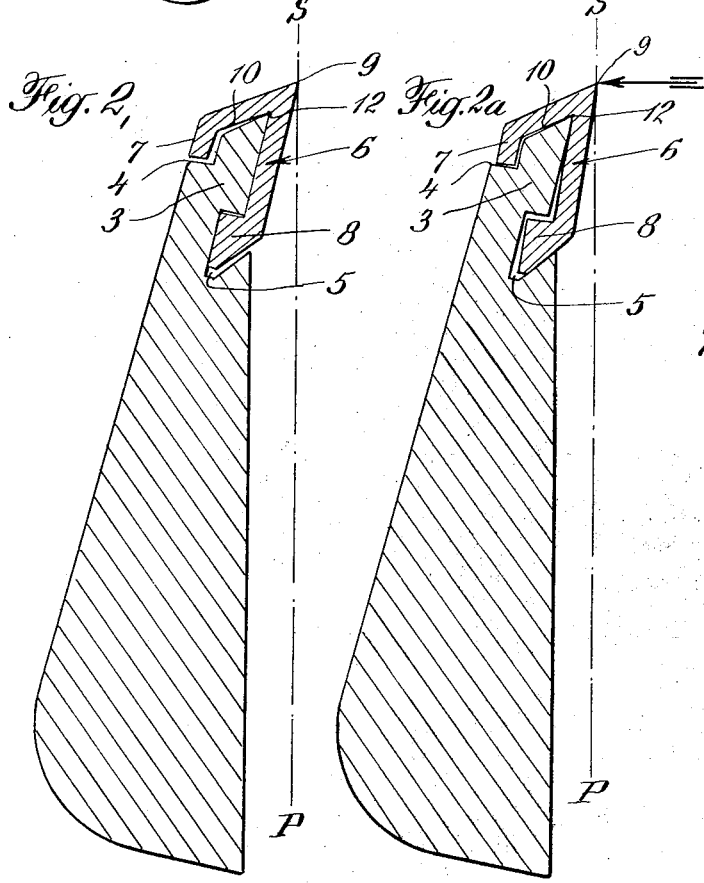
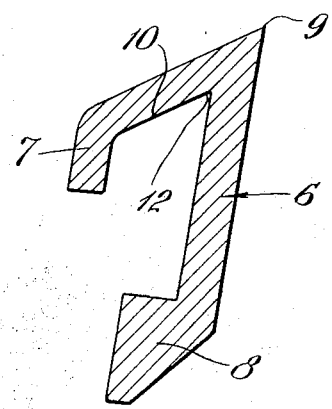
INVENTOR
Morgan Parker
John W. B. Ladd
BY
Pennie, Davis, Marvin & Edmonds
ATTORNEYS Patented May 1, 1934

1,956,587

UNITED STATES PATENT OFFICE 1,956,587

SCISSORS

Morgan Parker, New York, and John W. B. Ladd, Chappaqua, N. Y., assignors to Bard-Parker Company, Inc., a corporation of New York Application March 4, 1932, Serial No. 596,743

6 Claims. (Cl. 30—13)

This invention relates to improvements in detachable blade scissors.

In order to obtain the best shearing action with any scissors it is necessary to have the cutting edges of the blades interact at a definite angle. If this angle is too small a rubbing rather than a shearing action takes place between the cutting edges. If too great the cutting edges will dig into each other. In our copending applications, Serial Nos. 596,742 and 596,744 filed concurrently herewith we have illustrated and described detachable blade scissors of the general type of Patent No. 1,814,959, but having flat-faced frames, in which the necessary shearing angle is obtained by canting the blades and their supporting beads with reference to the inner faces of the frames. We have found that in use the shearing pressure tends to swing the blades back and flatten this small shearing angle, which has been carefully designed for most efficient cutting, unless the clearance between the blade and its bead is so small as to make difficult the production of interchangeable blades.

In accordance with the present invention we so construct the blade and the blade supporting frame structure that it is impossible for the blade to swing more than a few degrees under shearing pressure, while at the same time it is not necessary to reduce the clearance between the blade and its support and so make difficult the production of interchangeable blades. We attain this result by providing the bead embracing flange on the shear side of the blade with a downward extension which cooperates with the outer wall of a corresponding groove in the frame to limit the swing under shearing pressure and does not necessitate a too nice fit between blade and bead.

In the accompanying drawing we have illustrated a preferred embodiment of our invention. Figure 1 is an elevation of a pair of scissors constructed in accordance with our present invention; Figure 2 is an enlarged section of the frame and blade on the line 2—2 showing the blade tipped towards the shearing plane; Figure 2a is another view of the section on the line 2—2 showing the blade rolled back under pressure in the direction of the arrow at right angles to the shearing plane. The line S—P indicates the location of the shearing plane; Figure 3 shows an enlarged cross section of the detachable blade itself.

The scissors shown in Figure 1 comprise frames 1 pivoted together by means of an ordinary pivot screw 2. Extending along the operative edge of each frame from the tip to a point near the pivot screw is a bead or rail 3 defined by a shoulder 4 and an undercut groove 5. On this bead is mounted a flexible detachable blade 6 of the general type illustrated in Patent No. 1,814,959 provided with a flange 7 seated within the shoulder 4 and a dove-tail flange 8 seated within the groove 5. As illustrated in Figures 2 and 2a the rail or bead 3 is inclined slightly towards the inner face of the frame so that the blade 6, when mounted, is canted slightly with reference to the shearing plane, the sharpened edge 9 of the blade lying above the plane of the frame.

Figure 2 shows the relation between the bead 3 and the blade 6 before any pressure is applied between the two frames. The dove-tail 8 is in contact with the inner portion of the groove 5 while the flange 7 and surface 10 are both out of contact with the bead 3 and the shoulder 4. When pressure is applied to the blade 6 in the direction of the arrow at the cutting edge 9, as shown in Figure 2a, the blade will rotate around the point 12 in the direction of the arrow until this rotation is stopped by the outer face of the dove-tail 8 coming in contact with the sloping wall of the groove 5. There may still be clearance between the surface 10 and flange 7 and the bead 3 but this will not affect the tendency of the blade to roll.

The angle which the shearing face of the blade makes with the shear plane may permissibly vary from 3° to 15° with the mean as a desideratum. With the construction of the present invention we can limit the angular variation to within 5° to 11°.

We claim:

1. Scissors comprising a pair of pivoted frames, a bead extending along the operative edge of a frame, an undercut groove in the inner face of the frame beneath the bead, a blade loosely mounted on and embracing the bead with its cutting edge in a plane above the plane of the frame, an extension on the shear face of the blade lying within the undercut groove to limit rolling of the blade under shearing pressure.

2. Scissors comprising a pair of pivoted frames, a bead extending along the operative edge of a frame, an undercut groove in the inner face of the frame beneath the bead, a blade loosely mounted on and embracing the bead with its cutting edge in a plane above the plane of the frame, flanges on the blade embracing the bead, the flange on the shear face of the blade extending within the undercut groove and shaped to abut against its outer wall to limit swinging of the blade under shearing pressure.

3. Scissors comprising a pair of pivoted frames, a bead extending along the operative edge of each frame, an undercut groove of dove-tail cross section in the inner face of each frame beneath the bead, a blade mounted on and embracing each bead and a dove-tail flange on each blade lying within the dove-tail groove.

4. A detachable blade for scissors having flanges for embracing an undercut bead on a scissors frame, the flange on the shear face of the blade having a downwardly and inwardly projecting extension.

5. A detachable blade for scissors having flanges for embracing an undercut bead on a scissors frame, the flange on the shear face of the blade being of dove-tail shape with the head or wide end of the dovetail extending inwardly.

6. A detachable blade for scissors having a cross-section substantially as illustrated in Figure 3.

MORGAN PARKER.
JOHN W. B. LADD.